(12) United States Patent
Shim et al.

(10) Patent No.: US 12,509,651 B2
(45) Date of Patent: Dec. 30, 2025

(54) PURIFICATION METHOD OF HIGH PURITY ISOPROPYL ALCOHOL USED IN SEMICONDUCTOR CLEANING PROCESS

(71) Applicant: JAEWON INDUSTRIAL CO., LTD, Jeollanam-do (KR)

(72) Inventors: Sung Won Shim, Jeollanam-do (KR); Byung Ki Son, Daejeon (KR); Yung Lim, Seoul (KR); Hwan Choi, Jeollanam-do (KR); Youn Soo Shin, Jeollanam-do (KR); Min Young Kim, Jeollanam-do (KR); Tae Gi Choi, Jeollanam-do (KR)

(73) Assignee: JAEWON INDUSTRIAL CO., LTD, Jeollanam-do (KR)

( * ) Notice: Subject to any disclaimer, the term of this patent is extended or adjusted under 35 U.S.C. 154(b) by 352 days.

(21) Appl. No.: 18/195,683

(22) Filed: May 10, 2023

(65) Prior Publication Data
US 2023/0365904 A1 Nov. 16, 2023

(30) Foreign Application Priority Data
May 10, 2022 (KR) .................. 10-2022-0057278

(51) Int. Cl.
*C12H 1/16* (2006.01)
*C12H 1/04* (2006.01)
(52) U.S. Cl.
CPC .................. *C12H 1/16* (2013.01); *C12H 1/04* (2013.01)
(58) Field of Classification Search
None
See application file for complete search history.

(56) References Cited

U.S. PATENT DOCUMENTS

| 2,666,735 | A | * | 1/1954 | Morrell | .................... | C07C 29/84 203/28 |
| 4,762,616 | A | * | 8/1988 | Litzen | ..................... | C07C 29/86 210/634 |
| 4,788,043 | A | * | 11/1988 | Kagiyama | .......... | B01D 61/3621 422/292 |

(Continued)

FOREIGN PATENT DOCUMENTS

| JP | H11-506431 A | 6/1999 |
| JP | 2016-528280 A | 9/2016 |

(Continued)

OTHER PUBLICATIONS

Notice of Allowance issued on Aug. 6, 2024 from Japan Intellectual Property Office in a counterpart Japanese Patent Application No. 2023-078219 (all the cited references are listed in this IDS.) (English translation is also submitted herewith.).

(Continued)

*Primary Examiner* — Robert J Popovics
(74) *Attorney, Agent, or Firm* — The PL Law Group, PLLC

(57) ABSTRACT

In a method for purifying highly pure isopropyl alcohol used in a semiconductor cleaning process, diacetone alcohol present in isopropyl alcohol is removed by an adsorption process, and diacetone alcohol, triisopropyl borate, and metal impurities are removed by a distillation process. The purified isopropyl alcohol may have a purity of has the moisture of 10 ppm or less, the triisopropyl boron compound of 50 ppt or less, and each metal of the metal impurities of 20 ppt or less.

8 Claims, 2 Drawing Sheets

(56) References Cited

U.S. PATENT DOCUMENTS

| | | | | |
|---|---|---|---|---|
| 5,571,387 | A * | 11/1996 | Marker | C07C 29/76 |
| | | | | 568/699 |
| 5,868,906 | A * | 2/1999 | Adams | B01D 3/146 |
| | | | | 203/DIG. 16 |
| 6,733,637 | B1 * | 5/2004 | Burton | C07C 29/80 |
| | | | | 203/99 |
| 9,758,458 | B2 * | 9/2017 | Park | B01D 61/362 |
| 11,427,522 | B2 * | 8/2022 | Kim | C07C 29/80 |
| 12,043,592 | B2 * | 7/2024 | Romero | B01D 71/262 |
| 12,312,299 | B2 * | 5/2025 | Romero | B01J 47/12 |
| 2016/0200649 | A1 * | 7/2016 | Park | C07C 29/80 |
| | | | | 568/916 |
| 2016/0200650 | A1 * | 7/2016 | Park | B01D 61/363 |
| | | | | 422/261 |
| 2016/0207858 | A1 * | 7/2016 | Park | C07C 29/76 |
| 2021/0061741 | A1 * | 3/2021 | Kim | C07C 31/10 |
| 2021/0300851 | A1 | 9/2021 | Romero et al. | |
| 2023/0365904 | A1 * | 11/2023 | Shim | C12H 1/16 |
| 2025/0034068 | A1 * | 1/2025 | Kim | C07C 29/80 |

FOREIGN PATENT DOCUMENTS

| | | |
|---|---|---|
| KR | 10-2004-0085710 A | 10/2004 |
| KR | 10-2010-0061790 A | 6/2010 |
| KR | 10-1206214 B1 | 12/2012 |
| KR | 10-2014-0032331 A | 3/2014 |
| KR | 10-2015-0021484 A | 3/2015 |
| KR | 10-1582001 B1 | 12/2015 |
| KR | 10-1662895 B1 | 10/2016 |

OTHER PUBLICATIONS

Notice of Allowance issued on Jun. 20, 2025 from Korean Patent Office in a counterpart Korean Patent Application No. 10-2023-0060732 (all the cited references are listed in this IDS.) (English translation is also submitted herewith.).

* cited by examiner

PURIFICATION METHOD OF HIGH PURITY ISOPROPYL ALCOHOL USED IN SEMICONDUCTOR CLEANING PROCESS

CROSS-REFERENCE TO RELATED APPLICATION AND CLAIM OF PRIORITY

This application claims the benefit under 35 USC § 119 of Korean Patent Application No. 10-2022-0057278 filed on May 10, 2022 in the Korean Intellectual Property Office, the entire disclosure of which is incorporated herein by reference for all purposes.

BACKGROUND

1. Technical Field

The present invention relates to a method for purifying isopropyl alcohol, and more particularly to a method for purifying high purity isopropyl alcohol used in semiconductor cleaning process.

2. Background Art

Isopropyl alcohol (hereinafter, "IPA") is used in a variety of applications, including, for example, cleaning agent applications in the electronic industry such as the manufacture of semiconductor or liquid crystal display (LCD).

In the semiconductor cleaning process, conventionally, a wafer was patterned and then cleaned with moisture, but there was a problem that pattern collapse would occur during cleaning with moisture. Therefore, in order to solve these problems, IPA, which has a low surface tension against moisture and excellent solubility and volatility, has been used.

In the case of IPA used in the semiconductor cleaning process, the specifications for moisture and impurities are very strict.

The IPA used in the semiconductor cleaning process maintains a purity of 99.999% (5N) or more, but maintains moisture of 10 ppm or less, metal impurities of 20 ppt or less, triisopropyl borate (hereinafter also referred to as a boron compound) of 50 ppt or less, and diacetone alcohol is completely removed.

Industrial IPA, which is a raw material, contains moisture and impurities exceeding the specifications required in the semiconductor cleaning process, and therefore, there is a need to purify them so as to maintain a purity of 99.999% (5N) or more.

SUMMARY

It is an aspect of the present invention to provide a method for purifying a high purity isopropyl alcohol in which industrial isopropyl alcohol is purified by introducing an adsorption process and a distillation process, thereby completely removing diacetone alcohol, and meeting the semiconductor grade standards for the contents of moisture, triisopropyl borate and metal.

In order to achieve the above and other aspects, provided herein is a method for purifying industrial isopropyl alcohol (hereinafter also referred to as IPA), which is a raw material, using an adsorption process and a distillation process. According to an embodiment of the present invention, there is provided a method for purifying isopropyl alcohol, the method including removing diacetone alcohol (hereinafter referred to as DAA) existing in the isopropyl alcohol through an adsorption process, and then removing diacetone alcohol, triisopropyl borate (hereinafter also referred to as boron compound) and metal impurities produced as a bottom stream through a distillation process.

The adsorption process includes passing isopropyl alcohol through molecular sieves 3A or 4A and then successively passing it through molecular sieves 10X or 13X, and the distillation process includes a first distillation process of removing impurities with a boiling point lower than that of isopropyl alcohol, and a second distillation process of distilling a bottom stream of the first distillation process, removing DAA, boron compound, and metal impurities having a boiling point higher than that of isopropyl alcohol and obtaining purified isopropyl alcohol in the top.

It is preferable that the molecular sieve is sufficiently cleaned with IPA containing 10 ppm or less of moisture before use, and it is preferable that nitrogen is purged to suppress the inflow of oxygen during the distillation process.

It is preferable that a temperature during the first and second distillation processes is maintained at 82° C. or less, and a reflux ratio during the second distillation process is maintained at 1.5 or more.

According to the embodiments of the present invention, it is possible to produce high-purity semiconductor-grade isopropyl alcohol in which the content of moisture, metals and boron compounds satisfies the standards required in the semiconductor cleaning process, and no diacetone alcohol exists.

Therefore, elution of metals can be prevented from a storage tank after production, a transfer tank lorry during transportation to customers, a storage tank and piping for customer use, and a high-purity isopropyl alcohol can be supplied to the semiconductor cleaning line, thereby reducing the defect rate of the semiconductor process and improving the productivity of the semiconductor.

DETAILED DESCRIPTION OF THE EMBODIMENTS

Unless otherwise defined, all terms used herein have the same meaning as commonly understood by one of ordinary skill in the art to which this invention belongs. When terms used herein discord from the commonly understood meaning, the terms will be interpreted as defined herein. Throughout the specification, when a part 'includes' a certain component, it means further including other components, rather than excluding other components, unless otherwise stated.

As used herein, the term "semiconductor grade" means maintaining the degree of purity and properties required in semiconductor cleaning processes, the term "removing" means reducing the content of a particular substance, and the term "completely removing" means a state in which a specific substance does not exist. That is, as described in Table 1 below, it means that a specific substance is not detected (N/D).

As used herein, the term 'high purity' means a purity of 99.99% or more, i.e., 5N or more.

As used herein, the term "industrial IPA" means a raw material IPA which contains excess impurities so that the purity of IPA is less than 99.999% (5N).

In describing the components of the present invention, there may be terms used like first, second, A, B, (a), and (b). These are solely for the purpose of differentiating one component from the other but not to imply or suggest the substances, order or sequence of the components.

In the following description of the present invention, detailed descriptions of known functions and components incorporated herein will be omitted when it may make the subject matter of the present invention unclear.

Hereinafter, embodiments of the present invention will be described in detail with reference to the accompanying drawings.

Figure 1:
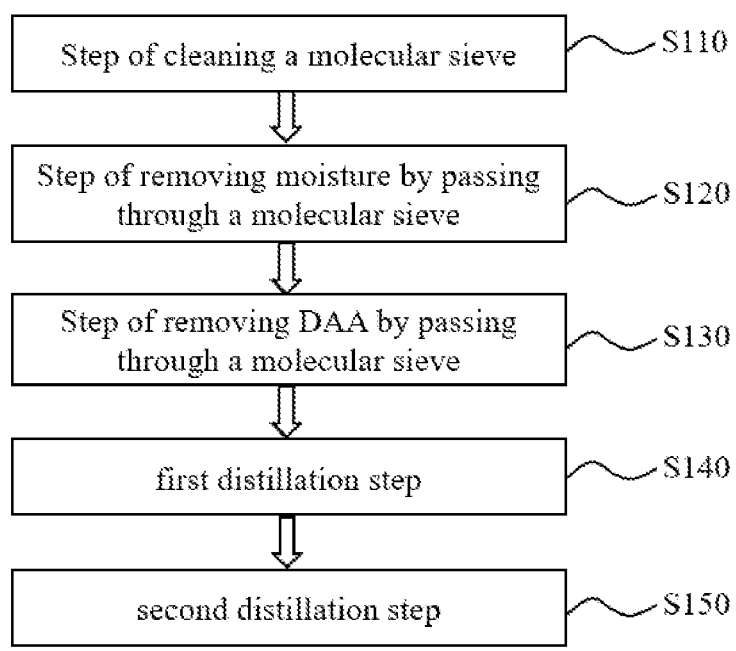
FIG. 1 is a diagram for explaining a purification process of isopropyl alcohol according to an embodiment of the present invention.

FIG. 1 is a diagram for explaining a purification method of isopropyl alcohol used in semiconductor cleaning process according to an embodiment of the present invention.

Referring to FIG. 1, a method for purifying isopropyl alcohol according to an embodiment of the present invention includes a step (S110) of cleaning molecular sieves used in an adsorption process with IPA, a first adsorption step (S120) of passing industrial IPA as a raw material through the cleaned molecular sieves 3A or 4A to remove moisture and diacetone alcohol, a second adsorption step (S130) of passing IPA through molecular sieves 10X or 13X to completely remove diacetone alcohol, a first distillation process step (S140) of removing impurities having a boiling point lower than that of IPA through distillation to obtain a bottom stream, and a second distillation process step (S150) of receiving supply of the bottom stream and distilling it to remove impurities having a boiling point higher than that of IPA in the bottom and obtaining purified IPA from the top.

First, the cleaning step (S110) will be described.

According to the present invention, the scope of rights of the present invention is not limited by the specific means, as long as the content of moisture existing in the raw material IPA can be reduced to a semiconductor-grade level through the adsorption process to completely remove DAA (diacetone alcohol). However, the adsorption process of an embodiment of the present invention uses molecular sieves.

Molecular sieves may contain residual basic materials due to manufacturing characteristics. Such residual basic materials may be converted into DAA by performing an aldol reaction of acetone formed by oxidation of IPA in a subsequent purification process. Therefore, in order to minimize the formation of DAA during the purification process, it is preferable to remove residual basic materials on the molecular sieve, and thus, sufficient cleaning of the molecular sieves prior to use is preferred.

The IPA used in the cleaning preferably contains 10 ppm or less of moisture, and it is preferable that the molecular sieves are sufficiently cleaned so that the pH can be maintained at 6.5 to 7.5.

Industrial IPA as a raw material is passed through the cleaned molecular sieves to remove moisture and DA (S120). Generally, in the industrial IPA, which is a raw material, several tens to several hundred ppm of moisture exists and several tens of ppm of DAA exists.

Therefore, the moisture can be reduced to 10 ppm or less by the first adsorption process of passing IPA, which is a raw material, through the molecular sieves 3A or 4A.

The moisture can be lowered to the semiconductor level by the first adsorption process, but DAA is not completely removed. Therefore, in order to completely remove DAA, it is necessary to successively pass IPA through molecular sieves 10X or 13X after the first adsorption process.

IPA used in the semiconductor process has very strict specifications for metals, which are impurities, and all items are controlled in units of ppt. The allowable metal content in IPA used in the semiconductor cleaning process is required to be 50 ppt or less, preferably 20 ppt or less for each metal.

Metals generally have very high boiling points and can be removed as a bottom stream in the distillation process, but when even a very small amount of DAA remains, it causes a problem of elution of metals from distillation towers, pipes, storage tanks, etc., which are made of stainless steel. Since DAA forms a chelate with metals, especially Fe, there is a problem of accelerating the elution of metals.

Therefore, in an embodiment of the present invention, in order to completely remove DAA existing in IPA, which is a raw material, a second adsorption process is performed in which the IPA, whose moisture is significantly reduced through the first adsorption process, is passed through molecular sieves 10X or 13X (S130).

When IPA is passed through 10X or 13X molecular sieves, DAA is adsorbed and removed by two mechanisms. First, it is adsorbed and removed in the form of salt with Na+ or K+ attached to the surface of the molecular sieve, and second, DAA molecules, which are slightly smaller in molecular size than the pores of the molecular sieves, are inserted/adsorbed into the pores and removed.

As described above, the IPA that has undergone the first and second adsorption processes contains an acceptable level of moisture in the semiconductor cleaning process, and DAA is completely removed and no longer exists.

As described above, if metals flow into the semiconductor manufacturing process, they will cause defects. Therefore, it is necessary to purify 20 types of metals contained in IPA to 50 ppt or less for each metal.

Metals managed by IPA for semiconductors are Ag, Al, As, Au, B, Ba, Ca, Cd, Cr, Cs, Cu, Ga, Ge, Hf, In, K, La, Li, Mg, Mn, Mo, Na, Nb, Ni, Pb, Sb, Sn, Sr, Ta, Ti, V, W, Y, Zn, Zr, etc. including Fe, each of these must be contained at 20 ppt or less, especially Fe ions being one of the most carefully managed metals.

Metals generally have boiling points higher than that of IPA, and are therefore easier to remove by ordinary distillation. Therefore, metals impurities can be reduced to a semiconductor-grade level through the distillation process.

Meanwhile, the molecular sieve binders used to reduce the content of moisture and completely remove DAA contain triisopropyl borate (hereinafter referred to as a boron compound), and also the boron compound may be eluted from the glass material during the purification process. Since such a boron compound also affects the unique characteristics of semiconductors, it is one of the items managed in units of ppt. IPA used in the semiconductor cleaning process is required to contain 50 ppt or less of boron compounds.

Since the boron compound has a boiling point of about 140° C., it can be removed by distillation process, but a part thereof is subjected to azeotropic distillation with isopropyl alcohol, which makes it difficult to completely remove it. Therefore, the distillation process is performed to remove the metal and boron compound, but the distillation process is preferably performed twice to reduce the content of the boron compound.

The distillation process may include a first distillation process (S140) and a second distillation process (S150).

Since this distillation process is performed at a high temperature, there is a problem that the IPA supplied to the distillation tower is exposed to oxygen and heat to produce acetone as shown in Reaction Scheme 1 below, which can be converted to DAA in the presence of an acid or base (alkaline) catalyst.

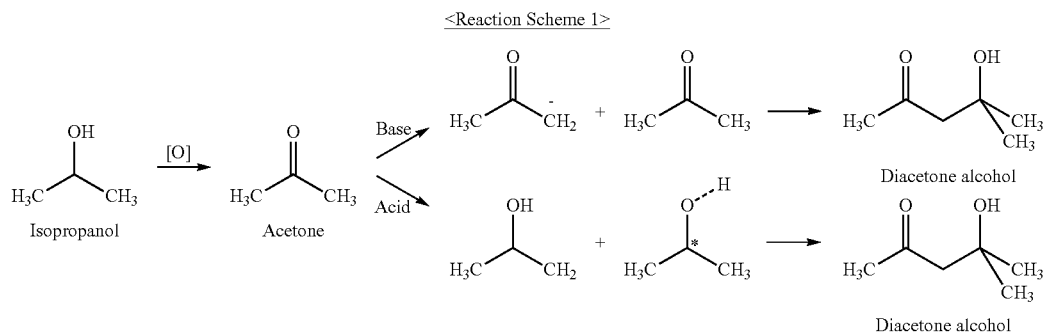

Therefore, in order to prevent IPA from being oxidized during the purification process, nitrogen is sufficiently supplied to the inside of the distillation tower and the auxiliary operating device to perform the distillation process. That is, it is preferable to sufficiently purge nitrogen during the distillation process to prevent oxygen inflow as much as possible.

The first distillation process is a process of removing impurities having a boiling point lower than that of IPA, and the second distillation process is a process of removing impurities having a boiling point higher than that of IPA.

Even if the distillation process is performed while purging nitrogen, additional DAA may be produced during the distillation process. Since even trace amounts of DAA remaining can be problematic, it is necessary to properly adjust the temperature of the distillation tower to completely remove DAA.

The residual amount of DAA is affected by the distillation temperature and the number of reflux in the distillation process. If the internal temperature of the distillation tower in the first distillation process is maintained at 82° C. or less, preferably 78 to 82° C., DAA is not produced. If the internal temperature of the distillation tower in the second distillation step is maintained at 82° C. or less, preferably 78 to 82° C., and the number of reflux in the second distillation tower is maintained at 1.5 or more, preferably 1.5 to 2 or more, it is possible to obtain IPA from which DAA is completely removed.

When the temperature of the first distillation tower exceeds 82° C., a trace amount of DAA may be produced, but the trace amount of the produced DAA has a boiling point of 166° C., which is higher than that of IPA and is therefore removed as the bottom stream in the second distillation tower, but most of them are subjected to concentration operation, so DAA is concentrated at the bottom and can rise to the top stream.

Therefore, it is preferable to maintain the temperature of the first distillation tower at 82° C. or less so that the IPA supplied to the second distillation tower from the bottom stream of the first distillation tower contains 0.5 ppt or less of DAA.

The IPA supplied to the second distillation tower contains very small amounts of DAA, boron compounds and metal compounds. Therefore, in order to completely remove DAA and reduce the boron compound to 50 ppt or less, the internal temperature of the distillation tower is maintained at 82° C. or less, preferably 78 to 82° C., and the number of reflux is maintained at 1.5 or more, preferably 1.5 to 2 or more.

Impurities such as DAA, boron compounds and metal compounds can be removed as a bottom stream by a second distillation step, and DAA can be completely removed and high purity IPA can be obtained as a top stream.

Therefore, through the adsorption and distillation process, it is possible to obtain semiconductor-grade purified IPA containing 10 ppm or less of moisture, 50 ppt or less of triisopropyl borate, and 20 ppt or less of each metal, and having a purity of 99.999 wt % or more in which diacetone alcohol does not exist.

The present invention will be described in more detail below with reference to examples. These examples are for illustrative purposes only, and the scope of the invention is not limited thereby.

Test Example 1

Molecular sieves 3A and 13X were cleaned 50 times by molecular volume with IPA having moisture of 10 ppm or less. Industrial IPA containing 120 ppm of moisture, 18 ppt of diacetone alcohol, and 100 ppt of boron compound was successively passed through the cleaned molecular sieves 3A and 13X.

Then, while maintaining the reboiler temperature of the first distillation tower at 78° C., 5 wt % of the input amount was removed as a top stream, and the bottom stream was supplied to a second distillation column.

When reboiler of the second distillation tower was also maintained at 78° C. and the reflux ratio was maintained at 1.5 to 2, materials having high boiling points such as diacetone alcohol, boron compounds, and metals were removed as bottom stream, and high purity semiconductor-grade IPA was obtained as a top stream.

Test Example 2

Purification was performed in the same manner as in Test Example 1, except that the reboiler temperatures of the first distillation tower and the second distillation tower were maintained at 80° C., respectively.

Test Example 3

Purification was performed in the same manner as in Test Example 1, except that the reboiler temperatures of the first distillation tower and the second distillation tower were maintained at 82° C., respectively.

<Comparative Example 1> to <Comparative Example 6>

Purification was performed in the same manner as in Test Example 1, except that the reboiler temperature and reflux ratio of the first distillation tower and second distillation tower were set to the conditions shown in Tables 1-1 and 1-2 below.

Comparative Example 7

Purification was performed in the same manner as in Test Example 1, except that IPA, which is the raw material, was used without cleaning.

<Comparative Example 8> and <Comparative Example 9>

Purification was performed in the same manner as in Comparative Test Example 7, except that the temperature of the first distillation process was maintained as shown in Tables 1-1 and 1-2 below.

Comparative Example 10

Purification was performed in the same manner as in Test Example 3, except that the raw material IPA was passed through only molecular sieve 3A and then put into the distillation process.

Comparative Example 11

Purification was performed in the same manner as in Comparative Example 10, except that the reflux ratio was maintained at 2.5 to 3.

The contents of raw materials used in the purification processes of Test Examples 1 to 3 and Comparative Examples 1 to 11, and water, diacetone alcohol (DAA), and boron compounds contained in IPA after each process step were measured, and the results are as shown in Tables 1-1 and 1-2 below. In Tables 1-1 and 1-2, the units of moisture content are ppm and the units of DAA and boron compound contents are ppt.

As can be seen from Tables 1-1 and 1-2, according to Test Examples 1 to 3 of the present invention, it is possible to obtain high-purity IPA that contains 10 ppm or less of moisture and 50 ppm or less of boron compounds, and has completely removed diacetone alcohol.

TABLE 1-1

|  | raw material | | | after passing through M/S 3A | | | after passing through M/S 13X | | |
| --- | --- | --- | --- | --- | --- | --- | --- | --- | --- |
|  | moisture | DAA | boron compound | moisture | DAA | boron compound | moisture | DAA | boron compound |
| Test Ex. 1 | 120 | 18 | 100 | 8 | 10 | 315 | 8 | N/D | 321 |
| Test Ex. 2 | 120 | 18 | 100 | 8 | 10 | 310 | 8 | N/D | 325 |
| Test Ex. 3 | 120 | 18 | 100 | 8 | 9 | 321 | 7 | N/D | 321 |
| comp. Ex. 1 | 120 | 18 | 100 | 8 | 10 | 310 | 7 | N/D | 356 |
| comp. Ex. 2 | 120 | 18 | 100 | 8 | 11 | 333 | 7 | N/D | 341 |
| comp. Ex. 3 | 120 | 18 | 100 | 8 | 9 | 310 | 6 | N/D | 361 |
| comp. Ex. 4 | 120 | 18 | 100 | 8 | 10 | 311 | 7 | N/D | 326 |
| comp. Ex. 5 | 120 | 18 | 100 | 8 | 9 | 310 | 7 | N/D | 382 |
| comp. Ex. 6 | 120 | 18 | 100 | 8 | 10 | 341 | 7 | N/D | 334 |
| comp. Ex. 7 | 120 | 18 | 100 | 8 | 10 | 331 | 8 | N/D | 330 |
| comp. Ex. 8 | 120 | 18 | 100 | 8 | 10 | 326 | 8 | N/D | 329 |
| comp. Ex. 9 | 120 | 18 | 100 | 8 | 9 | 319 | 9 | N/D | 320 |
| comp. Ex. 10 | 120 | 18 | 100 | 8 | 10 | 314 | — | | |
| comp. Ex. 11 | 120 | 18 | 100 | 8 | 10 | 314 | — | | |

TABLE 1-2

|  | bottom stream of the first distillation tower | | | | top stream of the second distillation tower | | | | |
| --- | --- | --- | --- | --- | --- | --- | --- | --- | --- |
|  | temperature (°C.) | moisture | DAA | boron compound | temperature (°C.) | reflux ratio | moisture | DAA | boron compound |
| Test Ex. 1 | 78 | 8 | N/D | 324 | 78 | 1.5-2 | 7 | N/D | 32 |
| Test Ex. 2 | 80 | 8 | N/D | 324 | 80 | 1.5-2 | 7 | N/D | 32 |
| Test Ex. 3 | 82 | 7 | 0.5 | 334 | 82 | 1.5-2 | 7 | N/D | 41 |
| comp. Ex. 1 | 85 | 7 | 0.9 | 327 | 85 | 1.5-2 | 8 | 0.3 | 41 |
| comp. Ex. 2 | 89 | 8 | 1.7 | 322 | 89 | 1.5-2 | 8 | 0.6 | 40 |
| comp. Ex. 3 | 82 | 6 | 0.5 | 326 | 82 | 1 | 7 | 0.01 | 51 |
| comp. Ex. 4 | 85 | 8 | 0.95 | 328 | 85 | 1 | 9 | 0.45 | 58 |
| comp. Ex. 5 | 89 | 8 | 1.65 | 329 | 89 | 1 | 8 | 0.85 | 60 |
| comp. Ex. 6 | 89 | 7 | 1.8 | 325 | 89 | 0.7 | 8 | 1.15 | 71 |
| comp. Ex. 7 | 78 | 8 | 1.2 | 331 | 78 | 1.5-2 | 7 | 0.4 | 44 |
| comp. Ex. 8 | 82 | 9 | 6.9 | 322 | 82 | 1.5-2 | 8 | 1.8 | 40 |
| comp. Ex. 9 | 85 | 8 | 11 | 319 | 85 | 1.5-2 | 7 | 3 | 37 |
| comp. Ex. 10 | 82 | 8 | 11 | 328 | 82 | 1.5-2 | 7 | 2.1 | 41 |
| comp. Ex. 11 | 82 | 7 | 11 | 328 | 82 | 2.5-3 | 7 | 0.5 | 31 |

\* M/S: Molecular Sieves
\* N/D: Not detected

As can be seen from Tables 1-1 and 1-2, according to Test Examples 1 to 3 of the present invention, it is possible to obtain high-purity IPA that contains 10 ppm or less of moisture and 50 ppm or less of boron compounds, and has completely removed diacetone alcohol.

It can be confirmed that when molecular sieves 3A and 13X were successively used as in Test Examples 1-3 and Comparative Examples 1-9, the content of moisture can be reduced to 10 ppm or less and DAA is completed removed. However, according to Comparative Examples 10 and 11, DAA is not completely removed in the adsorption process.

Considering that in the case of Test Example 3, the bottom stream of the first distillation tower contains 0.5 ppt of diacetone alcohol, it can be confirmed that DAA can be further produced in the distillation process. However, since the DAA further produced is removed as the bottom stream in the second distillation process, no DAA is observed at the top stream of the second distillation tower.

Looking at Test Examples 1 to 3 and Comparative Examples 1 and 2, it can be confirmed that the amount of DAA contained in the bottom stream changes depending on the temperature of the first distillation tower. In particular, comparing Test Example 3 with Comparative Examples 1 and 2, it can be seen that when the DAA contained in the bottom stream of the first distillation tower is 0.5 ppt or less, DAA is completely removed through the second distillation process (Test Example 3), but in the case of the bottom stream containing 0.9 ppt or more of DAA, the DAA is not completely removed even through the second distillation. Therefore, it can be seen that it is important to set the temperature condition of the first distillation tower so that DAA is contained at 0.5 ppt or less in the first distillation process.

Further, considering that in Comparative Example 3, 0.5 ppt of DAA is contained in the bottom stream of the first distillation tower and 0.01 ppt of DAA still exists in the top stream of the second distillation tower, it can be seen that the reflux ratio in the second distillation tower affects the residual amount of DAA. That is, it can be seen that DAA is not completely removed if the reflux ratio of the second distillation tower is 1. Further, in this case, it can be confirmed that the amount of the boron compound is 51 ppt, which exceeds the allowable value of 50 ppt required for the semiconductor grade.

Comparative Examples 4 to 6 are cases where the temperature of the first and second distillation towers is 82° C. or more and the reflux ratio of the second distillation tower is 1 or less, confirming that DAA exists in the top stream of the second distillation tower, and boron compounds also exists at 50 ppt or more.

Although Comparative Examples 7 and 8 were purified under the same conditions as Examples 1 and 3, respectively, except that the molecular sieve used in the adsorption process was not cleaned, it can be seen that diacetone alcohol still exists at 1.2 ppt and 6.9 ppt in the top steam of the first distillation tower. Therefore, in order to completely eliminate DAA, it can be seen that it is necessary to use the molecular sieve used in the adsorption process after cleaning with IPA.

Comparative Example 9 uses molecular sieves that have not been cleaned, and the temperature of the distillation process is 85° C., whereby DAA remains in the top stream of the second distillation tower.

Comparative Example 10 was purified in the same manner as in Test Example 3, except that the raw material IPA was passed through only molecular sieve 3A and then put into the distillation process, but 2.1 ppt of DAA still exists in the top stream of the distillation process, and even if the reflux ratio is increased through Comparative Example 11, DAA may still remain in the top stream of the second distillation tower if DAA is not completely removed in the adsorption process. Therefore, it is necessary to completely remove DAA in the adsorption process and then put into the distillation process.

The content of metals contained in the purified IPA obtained by Test Examples 1 to 3, Comparative Examples 1 to 6, and Comparative Examples 10 and 11 was analyzed (ICP-MS analysis), and the results are shown in Tables 2 and 3 below. In Tables 2 and 3, the content unit of each metal is ppt.

TABLE 2

| metal | Ag | Al | As | Au | B | Ba | Ca | Cd | Co | Cr | Cs | Cu | Fe | Ga | Ge | Hf | In | K |
|---|---|---|---|---|---|---|---|---|---|---|---|---|---|---|---|---|---|---|
| Test Ex. 1 | 0 | 2 | 1 | 0 | 11 | 0 | 0 | 0 | 0 | 0 | 0 | 0 | 1 | 0 | 0 | 0 | 0 | 1 |
| Test Ex. 2 | 0 | 1 | 0 | 0 | 9 | 0 | 0 | 0 | 0 | 0 | 0 | 0 | 2 | 0 | 0 | 0 | 0 | 2 |
| Test Ex. 3 | 0 | 1 | 2 | 0 | 13 | 0 | 0 | 0 | 0 | 0 | 0 | 0 | 1 | 0 | 0 | 0 | 0 | 2 |
| comp. Ex 1 | 0 | 0 | 1 | 0 | 14 | 0 | 0 | 0 | 0 | 0 | 0 | 0 | 1 | 0 | 0 | 0 | 0 | 3 |
| comp. Ex 2 | 0 | 0 | 1 | 0 | 8 | 0 | 0 | 0 | 0 | 0 | 0 | 0 | 2 | 0 | 0 | 0 | 0 | 1 |
| comp. Ex 3 | 0 | 1 | 2 | 0 | 7 | 0 | 0 | 0 | 0 | 0 | 0 | 0 | 0 | 0 | 0 | 0 | 0 | 2 |
| comp. Ex 4 | 0 | 1 | 2 | 0 | 6 | 0 | 0 | 0 | 0 | 0 | 0 | 0 | 0 | 0 | 0 | 0 | 0 | 2 |
| comp. Ex 5 | 0 | 2 | 2 | 0 | 12 | 0 | 0 | 0 | 0 | 0 | 0 | 0 | 1 | 0 | 0 | 0 | 0 | 1 |
| comp. Ex 6 | 0 | 1 | 0 | 0 | 11 | 0 | 0 | 0 | 0 | 0 | 0 | 0 | 1 | 0 | 0 | 0 | 0 | 2 |
| comp. Ex 10 | 0 | 0 | 0 | 0 | 10 | 0 | 0 | 0 | 0 | 0 | 0 | 0 | 1 | 0 | 0 | 0 | 0 | 2 |
| comp. Ex 11 | 0 | 2 | 0 | 0 | 9 | 0 | 0 | 0 | 0 | 0 | 0 | 0 | 1 | 0 | 0 | 0 | 0 | 4 |

TABLE 3

| metal | La | Li | Mg | Mn | Mo | Na | Nb | Ni | Pb | Sb | Sn | Sr | Ta | Ti | V | W | Y | Zn | Zr |
|---|---|---|---|---|---|---|---|---|---|---|---|---|---|---|---|---|---|---|---|
| Test Ex. 1 | 0 | 0 | 0 | 1 | 1 | 2 | 0 | 2 | 0 | 0 | 0 | 0 | 0 | 1 | 1 | 0 | 0 | 2 | 0 |
| Test Ex. 2 | 0 | 0 | 0 | 0 | 0 | 3 | 0 | 2 | 0 | 0 | 0 | 0 | 0 | 1 | 0 | 0 | 0 | 3 | 0 |
| Test Ex. 3 | 0 | 0 | 0 | 0 | 0 | 2 | 0 | 2 | 0 | 0 | 0 | 0 | 1 | 3 | 0 | 0 | 0 | 3 | 1 |
| comp. Ex 1 | 0 | 0 | 0 | 1 | 0 | 4 | 0 | 3 | 0 | 0 | 0 | 0 | 2 | 2 | 0 | 0 | 0 | 2 | 0 |
| comp. Ex 2 | 0 | 0 | 0 | 1 | 2 | 2 | 0 | 1 | 0 | 0 | 0 | 0 | 0 | 1 | 4 | 0 | 0 | 4 | 0 |
| comp. Ex 3 | 0 | 0 | 0 | 1 | 1 | 1 | 0 | 2 | 0 | 0 | 0 | 0 | 1 | 3 | 0 | 0 | 0 | 5 | 0 |
| comp. Ex 4 | 0 | 0 | 0 | 1 | 1 | 1 | 0 | 2 | 0 | 0 | 0 | 0 | 1 | 2 | 0 | 0 | 0 | 1 | 0 |
| comp. Ex 5 | 0 | 0 | 0 | 2 | 2 | 3 | 0 | 1 | 0 | 0 | 0 | 0 | 2 | 1 | 0 | 0 | 0 | 3 | 0 |
| comp. Ex 6 | 0 | 0 | 0 | 2 | 2 | 2 | 0 | 1 | 0 | 0 | 0 | 0 | 3 | 1 | 0 | 0 | 0 | 3 | 0 |

TABLE 3-continued

| metal | La | Li | Mg | Mn | Mo | Na | Nb | Ni | Pb | Sb | Sn | Sr | Ta | Ti | V | W | Y | Zn | Zr |
|---|---|---|---|---|---|---|---|---|---|---|---|---|---|---|---|---|---|---|---|
| comp. Ex 10 | 0 | 0 | 0 | 3 | 1 | 4 | 0 | 3 | 0 | 0 | 0 | 0 | 0 | 1 | 1 | 0 | 0 | 4 | 0 |
| comp. Ex 11 | 0 | 0 | 0 | 2 | 1 | 1 | 0 | 4 | 0 | 0 | 0 | 0 | 0 | 1 | 1 | 0 | 0 | 2 | 0 |

As can be confirmed in Tables 2 and 3, it can be seen that not only the purified IPA obtained in Test Examples 1 to 3 of the present invention, but also the purified IPA obtained in Comparative Examples 1 to 6, Comparative Examples 10 and 11 contain each metal at 20 ppt or less.

Therefore, the content of metals in the IPA defined by Test Examples of the present invention meets semiconductor standards.

Figure 2:
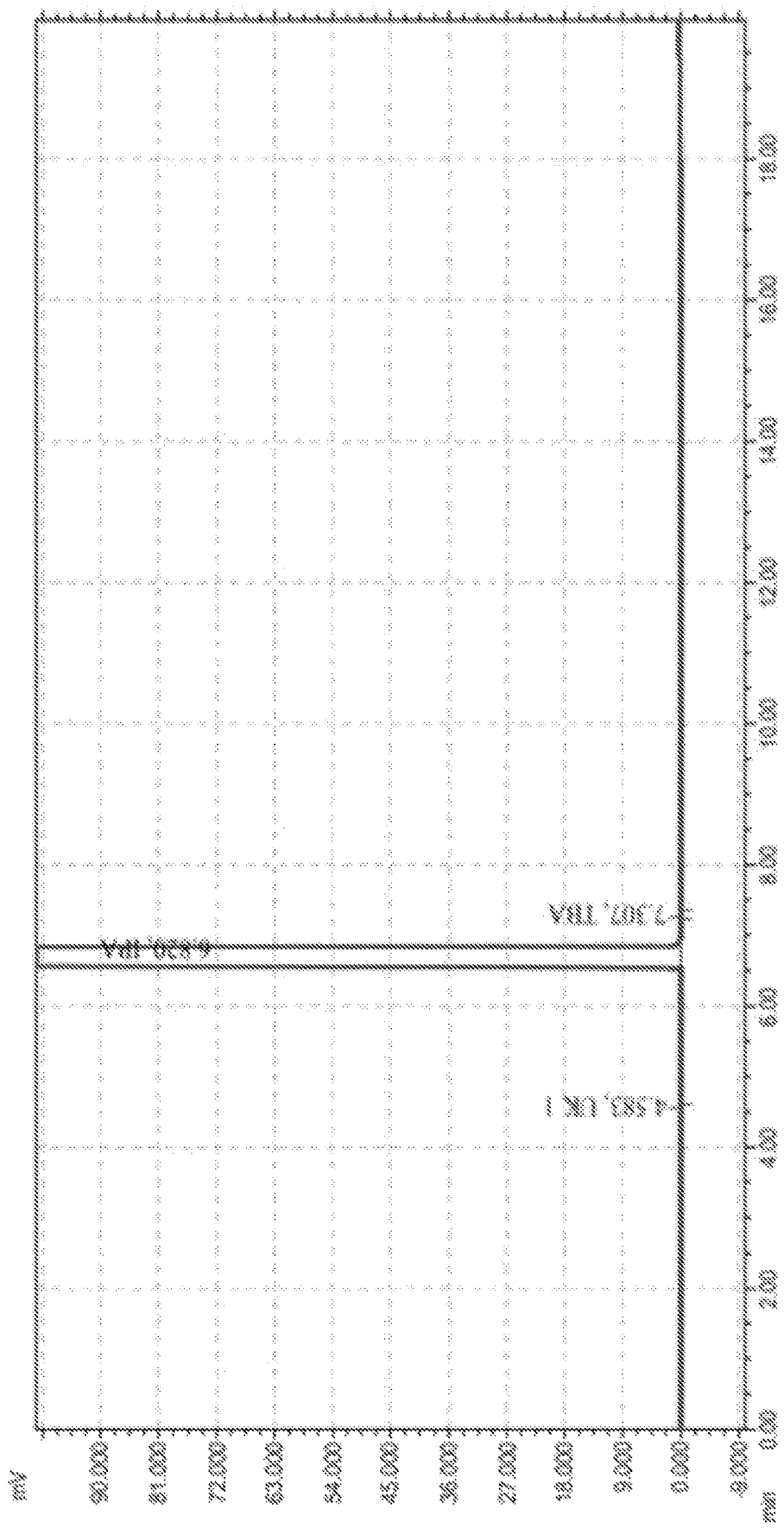
FIG. 2 is a gas chromatogram which analyzes components of isopropyl alcohol purified according to an embodiment of the present invention.

Further, the components of the high-purity purified IPA obtained in the top stream of the second distillation tower according to Test Example 1 of the present invention are analyzed, and the results are as shown in FIG. 2.

FIG. 2 is a gas chromatogram which analyzes components of isopropyl alcohol purified according to Test Example 1 of the present invention, and the component analysis results are shown in Table 4 below.

TABLE 4

| Retention time [min] | Label | Height [uV] | Area [uV*sec] | Area % [%] | Component name | Normalization % [%] |
|---|---|---|---|---|---|---|
| 4.583 | BMB | 13 | 18 | 0.00003 | UK 1 | 0.00000 |
| 4.974 | | 0 | 0 | 0.00000 | Methanol | 0.00000 |
| 5.134 | | 0 | 0 | 0.00000 | Acetaldehyde | 0.00000 |
| 5.877 | | 0 | 0 | 0.00000 | Ethanol | 0.00000 |
| 6.377 | | 0 | 0 | 0.00000 | Acetone | 0.00000 |
| 6.820 | BOV | 6434072 | 63858268 | 99.99966 | IPA | 99.99978 |
| 7.307 | BMB | 81 | 201 | 0.00031 | TBA | 0.00022 |
| 8.107 | | 0 | 0 | 0.00000 | n-Propanol | 0.00000 |
| 10.487 | | 0 | 0 | 0.00000 | 1,2,4-TMB | 0.00000 |
| 12.603 | | 0 | 0 | 0.00000 | Isopropyl-Acetate | 0.00000 |
| 13.217 | | 0 | 0 | 0.00000 | C-Hexane | 0.00000 |
| Σ | | 6434166 | 63858487 | 100.00000 | | 100.00000 |
| | | 6434072 | 63858268 | 99.99966 | Purity | 99.99978 |

As can be confirmed from Table 4 and FIG. 2, it can be seen that according to the purification method of the present invention, IPA having a purity of 99.999% or more (5N or more) can be obtained. That is, according to the purification method of the present invention, it is possible to obtain high-purity IPA with a purity of 5N or more in which no DAA exists while satisfying the levels required for semiconductor grades in the contents of moisture, boron compounds and metals.

Although exemplary embodiments of the present invention have been described for illustrative purposes only, those skilled in the art will appreciate that various modifications are possible, without departing from the essential characteristics of the present invention. Therefore, the embodiments disclosed in this specification are intended to explain, not limit the present invention, and the protection scope of the present invention is not limited by the above embodiments. The protection scope of the present invention should be construed according to the following claims, and all techniques within the scope equivalent thereto should be construed as being included in the scope of the present invention.

What is claimed is:

1. A method for purifying isopropyl alcohol from an industrial isopropyl alcohol in a liquid state having impurities including diacetone alcohol, triisopropyl borate, metal and water, the method comprising:
   removing the diacetone alcohol existing in the industrial isopropyl alcohol through an adsorption process; and
   performing a distillation process to reduce a level of the triisopropyl borate and the metal in the industrial isopropyl alcohol after removing the diacetone alcohol;
   removing diacetone alcohol by-produced during the distillation process to obtain a purified isopropyl alcohol having a purity of 99.999 wt % or more.

2. The method according to claim 1, wherein the content of the water in the purified isopropyl alcohol is 10 ppm or less through the adsorption process.

3. The method according to claim 1, wherein nitrogen is purged into a distillation tower in which the distillation process is performed to suppress an inflow of oxygen during the distillation process.

4. The method according to claim 1, wherein the adsorption process comprises passing the industrial isopropyl alcohol through a first molecular sieve 3A or 4A and then successively passing it through a second molecular sieve 10X or 13X.

5. The method according to claim 4, further comprising cleaning the first and second molecular sieves with isopropyl alcohol having a water of 10 ppm or less so as to maintain pH 6.5 to 7.5, before the adsorption process.

6. The method according to claim 1, wherein the distillation process comprises:
   a first distillation process of removing first impurities with a boiling point lower than a boiling point of isopropyl alcohol; and
   a second distillation process of distilling a bottom stream of the first distillation process to remove the diacetone alcohol, the triisopropyl borate, and the metal impurities having a boiling point higher than the boiling point of isopropyl alcohol in the bottom stream, and obtaining the purified isopropyl alcohol in a top of a distillation tower.

7. The method according to claim 6, wherein a distillation temperature during the first and second distillation processes is maintained at 82° C. or less, and a reflux ratio during the second distillation process is maintained at 1.5 or more.

8. The method according to claim 1, wherein the purified isopropyl alcohol has the water of 10 ppm or less, the triisopropyl borate of 50 ppt or less, and each metal of the metal impurities of 20 ppt or less.

\* \* \* \* \*